United States Patent [19]

Ijas et al.

[11] Patent Number: 5,091,156
[45] Date of Patent: Feb. 25, 1992

[54] WATERWALLS IN A FLUIDIZED BED REACTOR

[75] Inventors: Lasse K. Ijas; Aimo I. Asikainen, both of Varkaus, Finland; Arto V. I. Hotta; Neil Raskin; James Stone; Gregory Beavers; David Watson, all of San Diego, Calif.

[73] Assignee: A. Ahlstrom Corporation, Karhula, Finland

[21] Appl. No.: 309,563

[22] Filed: Feb. 13, 1989

[51] Int. Cl.$^5$ .................. F27B 15/06; F27B 15/16; B01J 8/18
[52] U.S. Cl. .............................. 422/146; 165/104.16; 165/83; 122/4 D; 122/235.12; 422/198; 422/200; 422/241
[58] Field of Search ............... 422/146, 241, 198, 200, 422/202; 165/104.16, 83; 122/4 D, 235 A

[56] References Cited

U.S. PATENT DOCUMENTS

| | | | |
|---|---|---|---|
| 4,210,491 | 7/1980 | Schulman | 165/104.16 X |
| 4,539,939 | 9/1985 | Johnson | 165/104.16 X |
| 4,554,967 | 11/1985 | Johnson et al. | 165/104.16 X |
| 4,593,652 | 6/1986 | Ehrlich | 165/104.16 X |
| 4,597,362 | 7/1986 | Daudet et al. | 165/104.16 X |
| 4,704,992 | 10/1987 | Waryasz | 165/104.16 X |

FOREIGN PATENT DOCUMENTS 453007 1/1988 Sweden.
454725 5/1988 Sweden.

Primary Examiner—Robert J. Warden
Assistant Examiner—Amalia Santiago
Attorney, Agent, or Firm—Nixon & Vanderhye

[57] ABSTRACT

A fluidized bed reactor generating heat has in its bottom part a grid for introduction of fluidizing gas into the rector and walls being made as waterwalls in which vertical water tubes are combined by flat plate material. The waterwalls are refractory lined in their lower part to withstand erosion and heat. The water tubes are bent outwards at an angle to the vertical plane in the intermediate section between the uncovered upper waterwall section and the refractory lined lower waterwall section in order to minimize erosion due to particles flowing downwards along the walls in the reactor.

23 Claims, 4 Drawing Sheets

WATERWALLS IN A FLUIDIZED BED REACTOR

This invention relates to a novel geometry of the peripheral waterwalls in a vertical fluidized bed reactor and more particularly to the geometry of the waterwalls in an intermediate region between the upper uncovered waterwall region and the lower refractory lined waterwall region.

The fluidized bed reactors are used in a variety of different combustion, heat transfer, chemical or metallurgical processes. Depending on the process, different bed materials are fluidized or circulated in the system. In combustion processes particulate fuels such as coal, coke, lignite, wood, wood waste, coal waste or peat as well as other particulate matter such as sand, ash, sulfur absorbent, catalysts or metaloxides can be the constituents of the fluidized bed.

A fluidized bed reactor generating heat comprises an upright reactor chamber, having substantially vertical peripheral walls. The walls are made as waterwalls or tube walls in which vertical tubes are combined by flat plate material or "fins". The walls in the lower part of the reactor are usually refractory lined to withstand the heat and erosion. The violent agitation of abrading particles and the relatively high concentration of solid material lead to most erosive conditions in the bottom region of the reactor.

At specific locations in the reactor there are both downward and upward flows of bed material. The absolute mass flow varies in radial and axial direction of the reactor chamber. The downward mass flow is extremely near the peripheral walls. As the density of particles increases downwards in the reactor chamber, even the downward falling film of particles along the peripheral walls, increases. The downward falling film can be as thick as 10-50 mm, or thicker. Any change in the direction of the downward falling film causes erosion.

The upper edge of the refractory lining in the waterwall construction forms a shoulder in the reactor chamber and causes eddy flow of the downward falling film of bed material. The direction of the film falling vertically downward along the "fins" combining two adjacent tubes, is partly changed and is directed to flow along the border line of the refractory lining. The eddy flow and horizontal flow of particles along the border line causes heavy erosion of the waterwall tubes especially close to the refractory lining. The erosion is especially problematic in solid fuel fired boilers having highly erosive conditions.

The tubes in the waterwalls have to be inspected from time to time and eventually recoated with sacrificial material or replaced by new tubes. Extensive downtime is required to cut out the deteriorated tubes and to install new ones or renew the sarificial surface. Both are laborious and time consuming process.

While the problem with erosion of tubes in fluidized bed reactors is well known and different solutions have been suggested to minimize the erosion, such solutions have not been entirely successful. A refractory lining shielding the tubes high up in the reactor would decrease the erosion but it would also decrease the heat transfer to the tubes.

Welding a layer, a sacrificial surface, on the tubes in particularly vulnerable regions has been tried. The welds would, however, not last for a very long time in highly erosive surroundings. It has also been suggested to cover the tubes with wear resisting material, i.e. sintered metal or ceramic materials. This is an expensive solution and decreases the heat transfer in the tubes.

It has also been suggested to decrease the velocity of the flow along the tubewalls by welding studs or other obstacles decreasing the flow velocity of particles on the tubes. The high velocity in the reactor is, however, advantageous for the heat transfer at the tube walls and should not necessarily be decreased. It has also been suggested in the Swedish Patent SE 454,725 to weld curved segments on the tubes at especially hard wearing locations.

It has further been suggested in the Swedish Patent SE 452,360 to arrange the entire reactor walls upwardly inwardly inclined to decrease erosion along the walls. This is a very peculiar construction and not very easily accomplished.

It is therefore an object of the present invention to provide an arrangement of the tube walls in a fluidized bed reactor which minimizes the erosion at the locations close to the refractory lined part of the walls.

It is still another object of the present invention to reduce the downtime in fluidized bed boilers which is due to tube replacements.

In order to achieve the above objects, the tube wall in the intermediate zone between the non-refractory lined tube wall and the refractory lined tube wall is bent downwards and outwards at an angle to the vertical plane.

The tube wall is either bent back to vertical at a distance downwards from the first bend or the tube wall may be bent inwards on an angle to form an inner sloped wall of the combustion chamber. Especially the front and rear walls could be formed as sloped walls, the side walls could be vertical.

The above brief desription as well as further objects, features and advantages of the present invention will be more fully appreciated by reference to the following detailed desription of presently preferred embodiments taken in conjunction with the accompanying drawings wherein:

DETAILED DESCRIPTION OF THE DRAWINGS

DETAILED DESCRIPTION OF PREFERRED EMBODIMENTS

Figure 1:
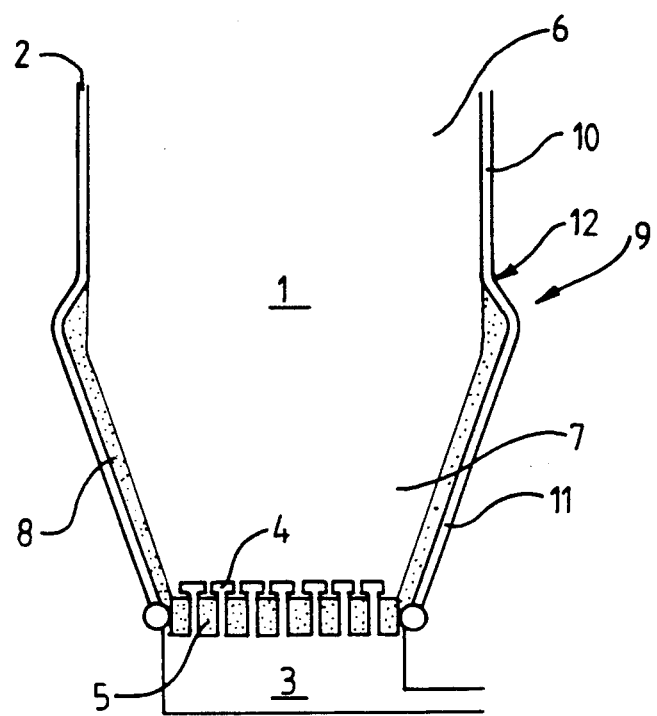
FIG. 1 is a cross sectional view of the lower part of a fluidized bed reactor.

FIG. 1 shows the lower part of a fluidized bed reactor having a combustion chamber 1 and peripheral tube walls 2, such as membranewalls. The particulate material in the combustion chamber is fluidized by air being introduced from an air chamber 3 beneath the combustion chamber. The air is distributed into the combustion chamber from the air chamber through nozzles 4 in a grid plate 5. If other gas than air is used to fluidize the particulate material in the combustion chamber, air or oxidizing gas has to be introduced through other inlets not shown. Fuel, additives and other particulate material or secondary gas, if needed, are supplied through inlets not shown in the figure.

The waterwalls are uncovered in the upper part of the combustion chamber 6. In the lower part of the combustion chamber 7 the waterwalls are lined with refractory material 8. In an intermediate zone 9 between the upper uncovered waterwall 10 and the lower refractory lined waterwall 11 the waterwalls are bent outwards. The height of the refractory lined wall part to the height of the total vertical wall in a combustion chamber is usually 1:3 to 1:10.

Figure 2:
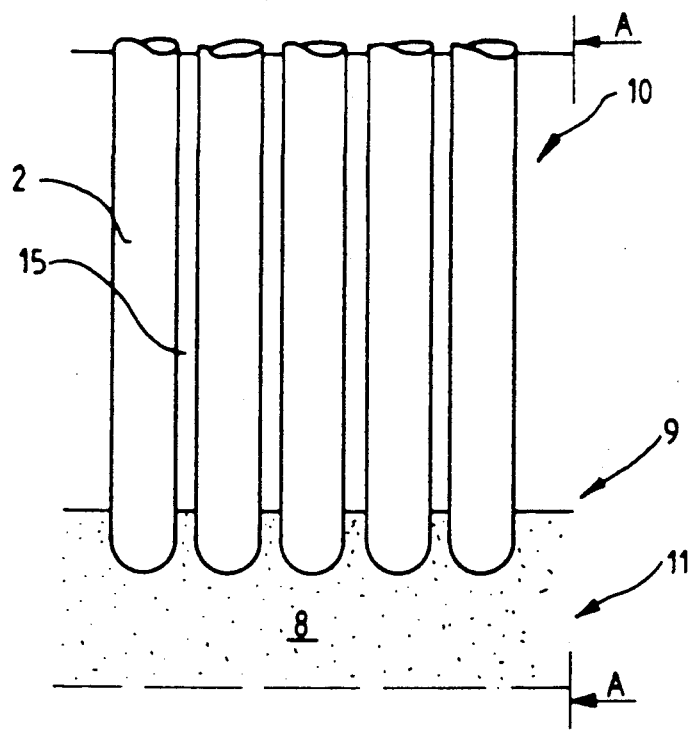
FIG. 2 is an enlarged schematic view of a part of the intermediate region between the upper uncovered tube wall and the lower refractory lined tube wall.
Figure 3:
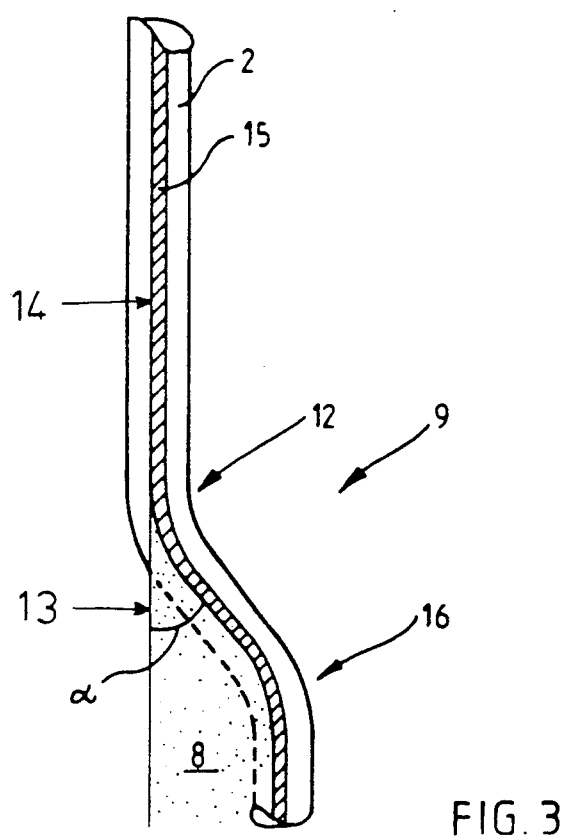
FIG. 3 is a cross sectional view of FIG. 2.

The intermediate zone can be seen more in detail in FIGS. 2 and 3. The waterwall 10 is at a point 12 bent downwards and outwards at an angle when coming to the intermediate zone between the uncovered and the refractory lined waterwall. The angle between the bent waterwall and the vertical plane can be 5°-30°. In most cases an angle of about 10-20 is sufficient.

The refractory lining 8 of the waterwall begins at the bend. The inner surface of the lining forms a straight downward extension of the inner surface of the flat plates or fins 15 combining two adjacent tubes 10. The inner surface of the refractory lining will be in the same vertical plane as the vertical plane of the flat plates or fins. The construction avoids the shoulder usually formed by refractory lining in a straight vertical waterwall and lets the falling film pass the tubes without eddy of the particle flow. A downward particle flow along the fins 15 can then continue downwards along the refractory lining and is not caused to change its direction. Also particles flowing downwards along the tubes 10 can continue their flow without disturbances. The bending of the waterwall protects the wall tubes very effectively.

Figure 4:
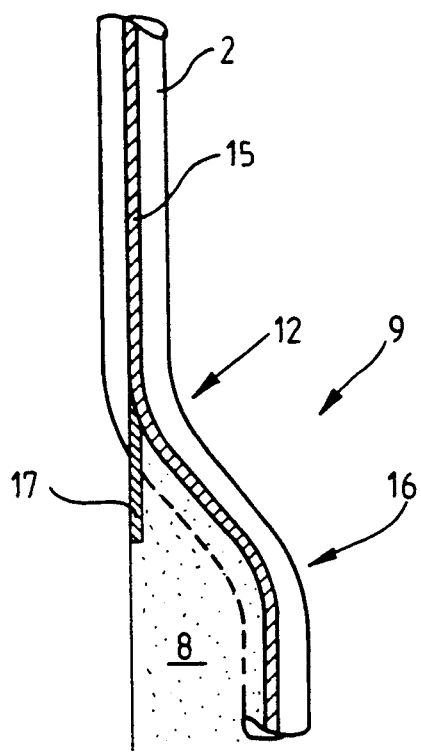
FIG. 4 shows a refractory liner of the invention with a cover or shield plate.

The uppermost relatively thin layer of refractory lining may be protected by a cover or a shielding plate 17 welded as a vertical extension to the plate 15, as shown in FIG. 4, in order to protect the refractory lining at its uppermost part.

If needed, a stay can be welded on the outside surface of the waterwall to stake the waterwall at the bend.

Figure 5:
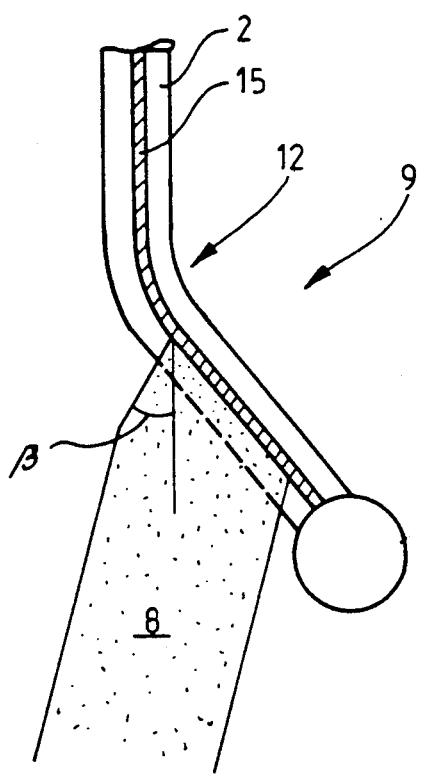
FIG. 5 shows an embodiment of the refractory liner of the invention with an edge or shoulder part.

The waterwall in the intermediate zone 9 is bent back to vertical at a lower point 16. The waterwall may even be bent further inwards if the cross sectional area of the lower part of the combustion chamber has to be decreased downwards as can be seen in FIGS. 1 and 5. If the waterwall is bent further inwards the inner surface of the refractory lining forms a downward and inward sloping surface of the refractory beginning at a vertical plane outwards from the vertical plane of the fins.

The waterwalls may secondly be bent inwards at an angle of about 5°-30° from vertical. The distance between the first and the second bend may be about 200-400 mm.

The intermediate part 9 of the waterwalls can easily be made as a module system with different bends and can be easily connected to the straight wall parts.

The refractory lining may according to another embodiment of the invention be made with an edge or a shoulder part as shown in FIG. 5 where the lining begins beneath the first bed in the waterwall. The shoulder may form an acute angle with the vertical plane. The angle is preferably chosen so that particles will not pile on the shoulder, e.g. an angle of about 45° may be used. In this embodiment the upper surface of the refractory lining may be shielded by a steel plate or like to protect the refractory lining from being deteriorated.

Figure 6:
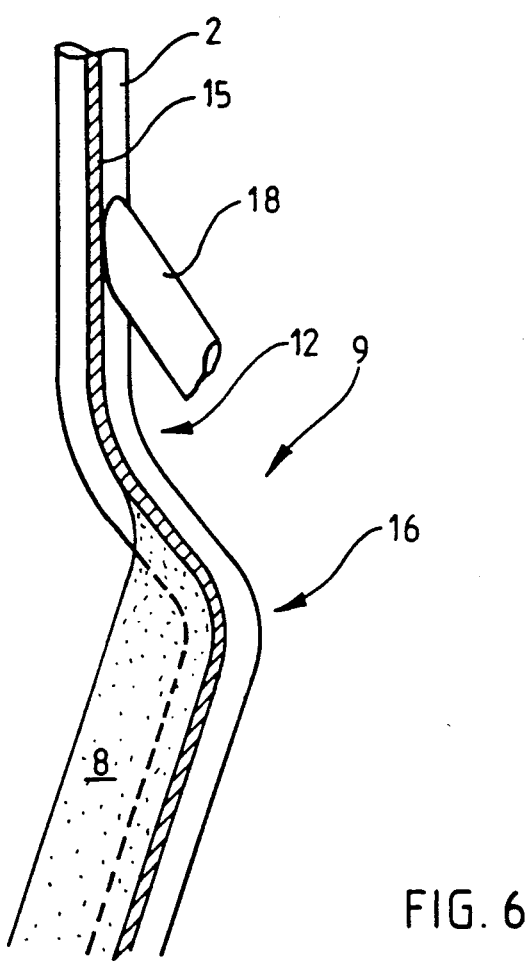
FIG. 6 shows another embodiment of the refractory liner of the invention with bifurcated tubes installed at the intermediate section.

The refractory lining may according to a further embodiment of the invention be made with a sloped shoulder part as shown in FIG. 6 where the lining also begins beneath the first bend in the waterwall. The particle film falling down along the waterwall will slide downward after impact with refractory lining.

In the embodiments shown in FIGS. 5 and 6 the downwards flowing particles will still continue their flow without heavy turbulence causing erosion at the border line of the refractory. The thickness of the refractory can in these embodiments be chosen independently of bends in the walls. The refractory layer begins preferably under the level at which the inner surface of the tubes after the bend has reached the vertical plane of the plates 15. At this level the particles flowing down from the plates 15 do not cause eroding turbulence at the border line between the tubes and the refractory lining.

The tube surface at the bend can be additionally protected by sacrificial material, which in this case does not wear out very easily as the turbulent particle flow near the tube surface is decreased.

Bifurcated water tubes 18 as shown in FIG. 6 may be installed at the intermediate section in the corners of the reactor chamber for sealing the waterwall at the bend in the corners. At the corners the distances between the tubes will increase when the tubes are bent. Additional tubes, e.g. bifurcated tubes, may be used to seal (fill) the spacings between the tubes.

Although the present invention has been described in conjunction with preferred embodiments, it is to be understood that other embodiments, forms and modifications of the invention coming within proper scope and spirit of the appended claims will, of course, readily suggest themselves to those skilled in the art. It is to be understood that all matter herein set forth or shown in the accompanying drawings is to be interpreted in an illustrative and not in a limiting sense.

What we claim is:

1. A reactor chamber in a fluidized bed reactor having a bottom, inside, and outside, and comprising:
   a grid at the bottom of the reactor chamber;
   walls defining the interior of the reactor chamber and including upper, lower, and intermediate sections;
   said upper section comprising a waterwall including a plurality of tubes attached by fins or plates therebetween to define an upper waterwall, said upper waterwall disposed above said intermediate wall section, and extending substantially vertically;
   said lower wall section having an inner surface of refractory material;
   said intermediate section extending from said upper waterwall and terminating adjacent the inner surface of refractory material of said lower wall section, and
   said waterwall at said intermediate section bends outwardly from said upper section, and then bends back inwardly behind said refractory inner wall of said lower section;
   means for minimizing erosion of said intermediate waterwall section, comprising the waterwall in said intermediate section bent outwardly from said inside of said upper waterwall of said reactor chamber at an angle to vertical.

2. A chamber as recited in claim 1 wherein said lower section comprises a waterwall continuation of said intermediate section, with an inner lining of refractory material covering said tubes.

3. A chamber as recited in claim 1 wherein said waterwall at said intermediate section bends back inwardly to vertical.

4. A chamber as recited in claim 1 wherein said waterwall at said intermediate section bends back inwardly at an angle to vertical.

5. A chamber as recited in claim 1 wherein said fins or plates in said upper waterwall section are substantially vertical and wherein said inner surface of refractory material of said lower wall section is coplanar with said fins or plates.

6. A chamber as recited in claim 5 further comprising a shielding plate provided as a vertical extension of said vertical fins or plates, to protect said refractory material at said intermediate section.

7. A chamber as recited in claim 1 wherein at said intermediate section said inner surface of said refractory material forms a downwardly and inwardly sloping surface beginning at a plane disposed outwardly of a plane containing the fins or plates of said upper section.

8. A chamber as recited in claim 1 wherein at the intermediate section said refractory material extends downwardly and inwardly from said outwardly bent portion of said waterwall, thereby forming an edge with said waterwall.

9. A chamber as recited in claim 1 wherein the height of said refractory inner surface of said lower wall section has a ratio of between 1:3 to 1:10 the total height of said walls.

10. A chamber as recited in claim 1 wherein the distance between the outward bend and inward bend of said waterwall at said intermediate section is 200-400 mm.

11. A chamber as recited in claim 1 wherein said waterwall in said intermediate section is bent outwardly at an angle of 5°-30° from vertical.

12. A chamber as recited in claim 1 wherein said waterwall in said intermediate section is bent outwardly at an angle of 5°-30° from vertical.

13. A chamber as recited in claim 12 wherein said waterwall intermediate section bends back inwardly at an angle of 5°-30° from vertical.

14. A chamber as recited in claim 1 further comprising bifurcated water tubes installed at the intermediate section of said waterwall for sealing the waterwall at the outwardly bent portion thereof.

15. A fluidized bed reactor comprising a reactor chamber having means for fluidizing particles, and a waterwall in said reactor chamber, said waterwall being generally vertical and defining the reactor chamber in the inner portion thereof; said waterwall including a lower portion having a refractory lining on the inner surface thereof, and said waterwall having an upper portion that is not refractory lined;
said waterwall being bent outwardly from said upper section, with respect to said inner surface, at a location immediately above said refractory lining.

16. A reactor chamber in a fluidized bed reactor having a bottom, inside, and outside, and comprising:
a grid at the bottom of the reactor chamber;
walls horizontally defining the interior of the reactor chamber and including upper, lower, and intermediate sections;
said upper section comprising a waterwall including tubes combined with fins or plates to define said upper waterwall, said upper waterwall disposed above said intermediate wall section, and extending substantially vertically therefrom;
said lower wall section having an inner surface of refractory material;
said intermediate section comprising an extension of said upper waterwall and terminating adjacent the inner surface of refractory material of said lower wall section;
the waterwall in said intermediate section bent outwardly from said inside of said upper waterwall of said reactor chamber, and at an angle to vertical; and
wherein the height of said refractory inner surface of said lower wall section has a ratio of between 1:3 to 1:10 the total height of said walls.

17. A chamber as recited in claim 16 wherein said lower section comprises a waterwall continuation of said intermediate section, with an inner lining of refractory material.

18. A chamber as recited in claim 16 wherein said waterwall at said intermediate section bends outwardly from said upper section, and then bends back inwardly behind said refractory inner wall of said lower section.

19. A chamber as recited in claim 16 wherein said fins or plates in said upper waterwall section are substantially vertical and wherein said inner surface of refractory material of said lower wall section is coplanar with said fins or plates.

20. A chamber as recited in claim 19 further comprising a shielding plate provided as a vertical extension of said vertical fins or plates, to protect said refractory material at said intermediate section.

21. A chamber as recited in claim 16 wherein said waterwall in said intermediate section is bent outwardly at an angle of 5°-30° from vertical.

22. A reactor chamber in a fluidized bed reactor having a bottom, inside, and outside, and comprising:
a grid at the bottom of the reactor chamber;
walls defining the interior of the reactor chamber and including upper, lower, and intermediate sections;
said upper section comprising a waterwall including a plurality of tubes attached by fins or plates therebetween to define an upper waterwall, said upper waterwall disposed above said intermediate wall section, and extending substantially vertically;
said lower wall section having an inner surface of refractory material;
said intermediate section terminating adjacent the inner surface of refractory material of said lower wall section; and
means for minimizing erosion of said intermediate waterwall section, comprising the waterwall in said intermediate section bent outwardly from said inside of said upper waterwall of said reactor chamber at an angle to vertical; and wherein at said intermediate section said inner surface of said refractory material forms a downwardly and inwardly sloping surface beginning at a plane disposed outwardly of a plane containing the fins or plates of said upper section.

23. A reactor chamber in a fluidized bed reactor having a bottom, inside, and outside, and comprising:
a grid at the bottom of the reactor chamber;
walls defining the interior of the reactor chamber and including upper, lower, and intermediate sections;
said upper section comprising a waterwall including a plurality of tubes attached by fins or plates therebetween to define an upper waterwall, said upper waterwall disposed above said intermediate wall section, and extending substantially vertically;

said lower wall section having an inner surface of refractory material;

said intermediate section terminating adjacent the inner surface of refractory material of said lower wall section; and means for minimizing erosion of said intermediate waterwall section, comprising the waterwall in said intermediate section bent outwardly from said inside of said upper waterwall of said reactor chamber at an angle to vertical; and wherein at the intermediate section said refractory material extends downwardly and inwardly from said outwardly bent portion of said waterwall, thereby forming an edge with said waterwall.

* * * * *